United States Patent
Thrane et al.

(10) Patent No.: US 10,602,747 B2
(45) Date of Patent: Mar. 31, 2020

(54) METHOD, A GUIDE ASSEMBLY AND A SYSTEM FOR SEPARATING VISCERA SETS EVISCERATED FROM SLAUGHTERED POULTRY

(71) Applicant: LINCO FOOD SYSTEMS A/S, Trige (DK)

(72) Inventors: Uffe Thrane, Hammel (DK); Bent Soerensen, Allingabro (DK); Torben Andersen, Glesborg (DK)

(73) Assignee: Linco Food Systems A/S, Trige (DK)

( * ) Notice: Subject to any disclaimer, the term of this patent is extended or adjusted under 35 U.S.C. 154(b) by 14 days.

(21) Appl. No.: 15/771,290

(22) PCT Filed: Oct. 24, 2016

(86) PCT No.: PCT/EP2016/075500
§ 371 (c)(1),
(2) Date: Apr. 26, 2018

(87) PCT Pub. No.: WO2017/072063
PCT Pub. Date: May 4, 2017

(65) Prior Publication Data
US 2018/0310574 A1    Nov. 1, 2018

(30) Foreign Application Priority Data
Oct. 26, 2015    (DK) ................................. 2015 70693

(51) Int. Cl.
*A22C 21/00* (2006.01)
*A22C 21/06* (2006.01)

(52) U.S. Cl.
CPC .................................. *A22C 21/06* (2013.01)

(58) Field of Classification Search
CPC .................................. A22C 21/06; A22B 5/18
(Continued)

(56) References Cited

U.S. PATENT DOCUMENTS 5,026,317 A * 6/1991 Kennedy ............ A22C 21/0053
452/106
5,041,053 A * 8/1991 Ellis ........................ A22C 21/06
452/106
(Continued)

FOREIGN PATENT DOCUMENTS

EP     0 541 150 A1    5/1993
NL     1 000 799 C2    1/1997
(Continued)

OTHER PUBLICATIONS

International Preliminary Report on Patentability dated May 1, 2018 from International Patent Application No. PCT/EP2016/075500, filed Oct. 24, 2016.
(Continued)

*Primary Examiner* — Richard T Price, Jr.
(74) *Attorney, Agent, or Firm* — David B. Tingey; Bryant J. Keller; Kirton McConkie

(57) ABSTRACT

The invention relates to a method, a guide assembly and a system for separating poultry viscera sets suspended from a viscera holder. In the method a guide member is moved so that said viscera set is arranged in an elongated opening of the guide member with the intestines and the gallbladder suspended below said guide member and the liver and gizzard positioned above it. The intestines and the gallbladder are then separated from the remaining viscera set while said liver rests on a first part of a separation support surface and said gizzard on a second part on the opposite side of an elongated opening. Before the separtion, the viscera set is brought into contact with an engagement member so that the gizzard is kept on the one side of the elongated opening at least until coming into contact with the separation support surface.

21 Claims, 7 Drawing Sheets

(58) Field of Classification Search
USPC ......................................................... 452/117
See application file for complete search history.

(56) References Cited

U.S. PATENT DOCUMENTS

| | | | | | |
|---|---|---|---|---|---|
| 5,252,715 | A | * | 10/1993 | Haupt | ..................... C07K 14/79 530/350 |
| 6,638,155 | B2 | * | 10/2003 | Jensen | ................. A22B 5/0005 452/106 |
| 7,059,953 | B2 | * | 6/2006 | Jensen | ................. A22B 5/0005 452/117 |
| 2008/0280550 | A1 | | 11/2008 | Reed et al. | |

FOREIGN PATENT DOCUMENTS

| | | |
|---|---|---|
| WO | 98/44806 A1 | 10/1998 |
| WO | 00/33661 A1 | 6/2000 |
| WO | 2014/183769 A1 | 11/2014 |
| WO | 2015/070880 A1 | 5/2015 |

OTHER PUBLICATIONS

International Search Report and Written Opinion dated Feb. 13, 2017 from International Patent Application No. PCT/EP2016/075500, filed Oct. 24, 2016.
Danish Search Report dated Apr. 15, 2016 from Danish Patent Application No. PA201570693, filed Oct. 26, 2015.

* cited by examiner

METHOD, A GUIDE ASSEMBLY AND A SYSTEM FOR SEPARATING VISCERA SETS EVISCERATED FROM SLAUGHTERED POULTRY

CROSS REFERENCE TO RELATED APPLICATION(S)

This application is a U.S. National Stage Entry of International Patent Application No. PCT/EP2016/075500, filed Oct. 24, 2016, which claims the benefit of Danish Patent Application No. PA 2015 70693, filed Oct. 26, 2015, the disclosures of which are hereby incorporated entirely herein by reference.

BACKGROUND

Technical Field

The present invention relates to a method, a guide assembly and a system for separating a viscera set eviscerated from slaughtered poultry.

State of the Art

Viscera separation is an important part of the poultry slaughtering process. The two most important parameters are speed and quality. Modern poultry slaughtering systems are capable of operating at processing speeds of above 200 birds per minute. As the value of the systems is directly proportional with their processing speed, even a small increase in the processing speed may be very valuable. However, an increase in the processing speed should not result in a corresponding decrease in the quality of the separation.

One particular important part of the viscera separation process is the separation of edible from non-edible parts. Typically, the intestines and gallbladder are perceived as non-edible parts, whereas the liver, heart and gizzard are perceived as edible parts. Especially, the separation of the gallbladder from the liver is challenging, as the gallbladder contains bile that may contaminate the edible parts of the viscera set if the separation is not done properly.

WO2015/070880 and WO2014/183769 disclose methods and apparatuses for separating viscera sets, wherein viscera sets suspended from holders under the influence of gravity are arranged in an elongated opening of a guide member in a manner whereby the intestines and the gallbladder are suspended below said guide member and the liver and gizzard are positioned above said guide member. The intestines and the gallbladder are then separated from the remaining viscera set while the liver rests on a separation support surface of the guide member.

In some cases, however, a part of the liver is pulled below the stationary guide plates and is cut off and discarded together with the gallbladder and the intestines, and in other cases a bit of the gallbladder is left on the liver.

Thus, it remains a problem to provide a method and/or system allowing an even more precise separation of the intestines and gallbladder from the remaining viscera at high processing speeds when viscera sets are suspended from viscera holders.

SUMMARY

A first aspect of the invention relates to a method for separating a viscera set held by a viscera holder on a viscera conveyor in manner whereby at least the liver, the intestines and the gallbladder are suspended below said viscera holder, said method comprising the steps of:

A) moving a guide member from a first position to a second position so that said viscera set is arranged in an elongated opening of the guide member in a manner whereby the intestines and the gallbladder are suspended below said guide member and the liver and gizzard are positioned above said guide member, said opening having a length direction, and B) separating the intestines and the gallbladder from the remaining viscera set while the guide member is in the second position and said liver and said gizzard rests on a separation support surface of said guide member, said separation surface including a first part on one side of the elongated opening adapted for supporting the gizzard and a second side on the opposite side of the elongated opening adapted for supporting the liver, wherein, before or simultaneous with step A), the viscera set is brought into contact with an engagement member in a manner so that at least the gizzard is kept on the one side of the elongated opening at least until coming into contact with the separation support surface.

Keeping the gizzard on one side of the elongated opening contributes to a well-defined orientation of the viscera set and thus ensures that the gizzard and liver end up in the intended position on the separation support surface. This in turn reduces the number of viscera sets, where the separation results in a piece of the gallbladder being left on the liver or a piece of the liver being cut off and discarded together with the intestines and gallbladder. Experiments have shown that by initially keeping both the gizzard and the liver on the one side of the elongated opening the differences in density and structure of the gizzard and the liver will result in the gizzard coming correctly to rest on the separation support surface on the one side of the elongated opening while the liver swings over to the opposite side of the elongated opening before coming to rest on the separation support surface. Using an engagement member has been shown to result in a 30% improvement in the number of viscera sets being optimally separated.

Depending on the embodiment of the engagement member and the anatomy of the viscera sets processed, the liver may swing to the opposite side of the engagement member already before the movement of the guide member is initiated, so that only the gizzard is kept back by the engagement member. This is entirely within the scope of the invention.

The method is particularly advantageous when the guide member is moved between the first position and the second position in a pivoting movement, since the changing angle of the guide member during the movement may contribute to the positioning of the liver and gizzard on the separation support surface. The method, however, also provides an advantage with other patterns of movement.

If the engagement member projects into the elongated opening at least during a part of step A), the transfer of the gizzard to the separation support surface may be aided and the risk of the viscera set being pinched between the engagement member and the guide member reduced.

In order to allow the separation to be performed with a low risk of the cutting device hitting the engagement member and/or guide member, it may be advantageous that the engagement member does not project into the elongated opening of the guide member when the guide member is in the second position.

The size and shape of the engagement member may vary depending for example on the space available, but it is presently considered advantageous that the viscera set is brought into contact with the engagement member in a manner so that the centre of gravity of the gizzard is engaging the engagement member directly or indirectly, i.e. with other tissue or organs in between the gizzard and the engagement member.

A specific embodiment, which provides a good support for the gizzard, is where the part of the engagement member coming into contact with the viscera set is plate-shaped, substantially planar and extending in a plane defined by the length direction of the elongated opening, and substantially perpendicular to the plane of the separation support surface at the elongated opening. This embodiment is also easy to keep clean due to its simple structure, but it will be understood that similar advantages may be achieved with a brace made for example from a bent rod. Stainless steel is a material well-suited for the engagement member as well as other parts of the guide assembly.

The actual separation may be achieved in a number of ways, including by a blade positioned between said guide member and said engagement member, by edges of the elongated opening of the guide member moved together like scissors, and/or by a pull on the intestines and/or gallbladder.

To further facilitate the introduction of a blade or similar cutting device, the part of the engagement member coming into contact with the viscera set may be made with a substantially linear upper edge or surface, which is substantially parallel to the length direction of the elongated opening when the guide member is in the second position. This will provide a gap of substantially uniform height between the guide member and engagement member, and the underside of the guide member and/or the upper edge or surface of the engagement member may serve as a guide for the cutting device.

The well-defined orientation of the viscera set may be aided or secured if the intestines are gripped by a gripping member before or simultaneously with step A), and gripping the intestines will also contribute to the gallbladder coming out on the underside of the guide member when the viscera set is arranged in the elongated opening. In order to further contribute to ensuring the gallbladder is located underneath the guide member before separation, the gripping member may possibly perform a vertical movement whereby the intestines are pulled downwards through the elongated opening of the guide member. Such a downwards movement may be performed on all viscera sets or only where it has been detected that the gallbladder has not come out correctly. A similar effect may be achieved by keeping the gripping member at the same horizontal level and instead moving the guide member upwards.

A continuous processing may be achieved by making each of said viscera holders move as a pair with a guide assembly including the guide member and the engagement member at least for a distance.

A second aspect of the invention relates to a guide assembly for use in a system for separating viscera sets including a guide member with a separation support surface having an elongated opening for receiving a viscera set and with an engagement member arranged so that it keeps at least the gizzard on the one side of the elongated opening at least until coming into contact with the separation support surface. Such a guide assembly may be used in a viscera separation apparatus, possible replacing a prior art guide assembly without the engagement member, thereby improving the precision and efficiency of the separation apparatus as described with reference to the first aspect of the invention above.

The guide member will usually be moveable between a first inactive position and a second active position, and in experiments with chicken viscera sets it has been shown that the guide assembly is well-functioning if the separation support surface is preferably substantially vertical in the first position and substantially horizontal in the second position.

In some embodiments the guide member is able to pivot about an axis, which is substantially perpendicular to the elongated opening and/or parallel to the front edge, but other patterns of movement are also envisaged.

As described above, it may be advantageous that at least a part of the engagement member projects into the elongated opening at least in one position of the guide member, and in a specific embodiment the part of the engagement member coming into contact with the viscera set is plate-shaped, substantially planar and extending in a plane defined by the length direction of the elongated opening, and substantially perpendicular to the plane of the separation support surface at the elongated opening at least when the guide member is in the second position.

A gripping member arranged below said guide member for gripping a part of the intestines forms part of the guide assembly in some embodiments.

One way of providing the movement of the guide member is to embody said guide assembly with an assembly frame where at least said guide member is vertically movably arranged on said assembly frame with a first vertical position adapted for receiving a viscera set and a second vertical position above said first vertical position. The engagement member and/or gripping member may be mounted on the same assembly frame and any necessary movement of these members may also be provided by a movement relative to the assembly frame. It is also possible to make the entire assembly frame moveable in order to achieve a movement of the guide assembly in relation to the viscera holder.

In addition to allowing an easy coordination or synchronization of movement, arranging the guide member, engagement member and/or the gripping member on a common assembly frame, the provision of a guide assembly also allows the different parts to be easily provided, mounted and replaced as a unit, making the construction of a system according to the invention as well as maintenance and repair relatively easy. This is particularly so if members adapted for connecting the assembly frame to an apparatus frame, such as control members adapted for cooperating with guide tracks or the like on the apparatus frame, are made in a manner already known from other systems used in poultry slaughterhouses.

A third aspect of the invention relates to a system for separating viscera sets comprising a viscera conveyor comprising a plurality of viscera holders, at least one guide member, and at least one engagement member arranged so that it keeps at least the gizzard on one side of an elongated opening in the guide member at least until coming into contact with a separation support surface on the guide member. The advantages of such a system correspond to those described with reference to the first and second aspects of the invention above.

In order to allow movement of the guide member, the system may further include an activation mechanism adapted for moving the guide member, preferably to pivot about a horizontal axis. Such an activation mechanism may be provided as part of a guide assembly, possibly on an assembly frame, but may also be provided as an independent part of the system.

The mutual movement of the viscera holders and the guide member(s) may be achieved by providing the system with viscera holders adapted for moving substantially in the same horizontal plane and said guide member adapted for being moved upwards towards a viscera holder, possibly by a pivoting movement, but other patterns of movement are also envisaged.

For use in the separation process it is presently preferred that the system further includes a blade or similar cutting device arranged below the separation support surface at least when in a use position, said blade or similar cutting device preferably being adapted for being positioned between the engagement member and the guide member, when the guide member is in the second position. Other separation mechanisms may, however, also be provided, a few having been mentioned with reference to the first aspect of the invention above. The cutting device may form part of a guide assembly or be an independent part of the system.

Gripping members configured to move with a particular viscera holder and grip the intestines may form part of the system, and each gripping member may be configured to perform a downwards displacement and pull the intestines downwards through the elongated opening of the guide member as has also been described above.

Throughout this text it is to be understood that references to a member being "substantially vertical" or "substantially horizontal" are only intended as a general indication of direction. This for example means that when the guide member is described as being "substantially horizontal" in its active position it is to be understood as meaning that it should be able to form a supporting surface for the liver and gizzard. Likewise the "substantially vertical" inactive position is to be understood as a position where the guide member has been swung away and arranged in a position, where any liquid on the separation support surface will run off.

Reference to relative positions such as "above", "below", "upwards" or "downwards" are to be understood as applying to the guide assembly when mounted and in its intended use position.

The term "rests" it not to be understood in the very strict sense that for example the liver is absolutely stationary in relation to the separation support surface. Some movement may be involved due to the very high processing speeds in modern poultry processing. To avoid damage to the viscera set, particularly the liver, it is, however, preferred that the movement is limited so that the relative velocity of the liver in relation to the separation support surface is less than 25%, preferably less than 10%, of the velocity of the viscera holder.

Likewise is should be understood that the contact between the engagement member and the viscera set will often take the character of the viscera set resting against the engagement member, particularly if it is not arranged vertically, and that forces resulting from the movement of the individual parts of the system may influence the contact between the engagement member and the viscera set.

BRIEF DESCRIPTION OF THE DRAWINGS

In the following the invention will be described in closer detail with reference to embodiments shown in the drawing, where.

DETAILED DESCRIPTION OF EMBODIMENTS

Figure 3:
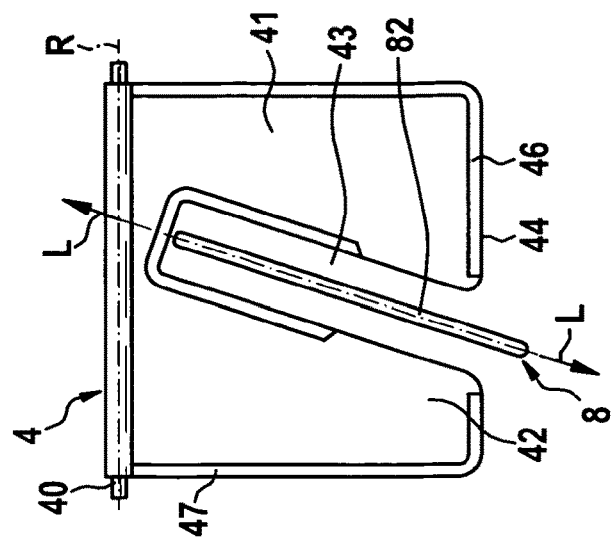
FIG. 3 shows a third embodiment of a guide member and an engagement member seen from above.
Figure 2:
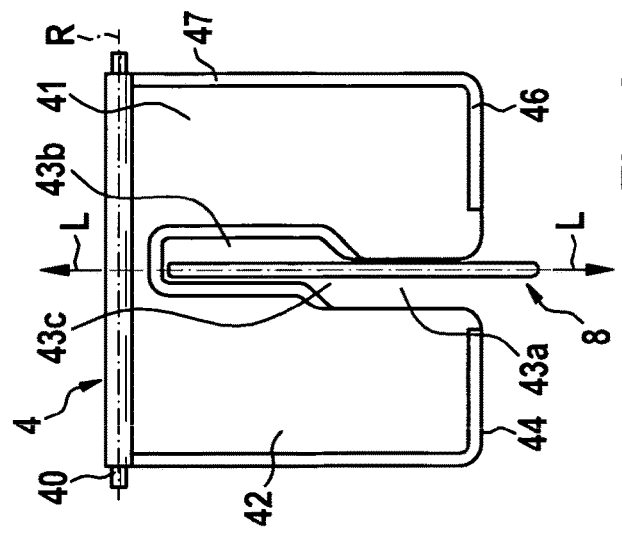
FIG. 2 shows a second embodiment of a guide member and an engagement member seen from above.
Figure 1:
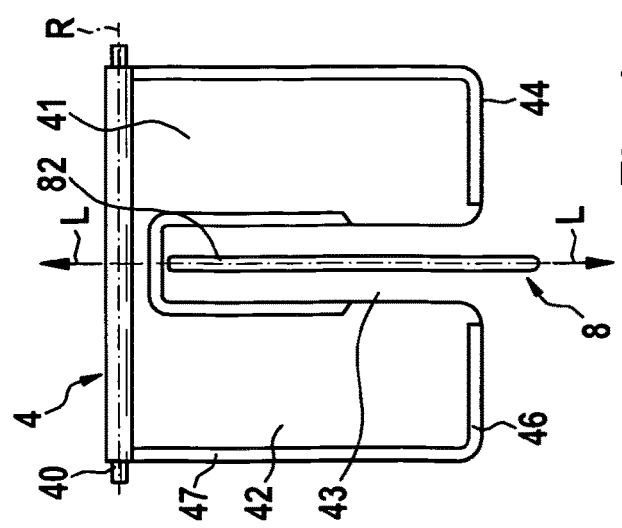
FIG. 1 shows a first embodiment of a guide member and an engagement member seen from above.

Three different embodiments of a guide member 4 and an engagement member 8 suitable for use according to the invention are shown in FIGS. 1 to 3. Where nothing else is stated, features having the same reference numbers have the same or substantially the same function.

The guide member 4 comprises a separation support surface 41, 42 intended for supporting at least the liver and gizzard of a viscera set as will be described later. The right-hand side 41 of the separation support surface is intended for supporting the gizzard and the left-hand side 42 is intended for supporting the liver. An elongated opening 43 extending from the front edge 44 of the guide member delimits the two sides 41, 42 of the separation support surface and is intended for surrounding the intestines of the viscera set as will also be described later. Opposite the front edge 44 in FIG. 1 is an axle 40 intended for defining a rotation axis R when connected to a guide assembly or apparatus frame.

The elongated opening 43 in FIG. 1 is straight, but in the embodiment shown in FIG. 2 the elongated opening includes three sections, a proximal section 43*a* located at the front edge 44 of the guide member, a distal section 43*b* located away from the front edge and an intermediate inclined section 43*c* interconnecting the proximal and distal sections. The distal section 43*b* of this embodiment is located to the right of the proximal section when seen from the front edge and from above and centred between the side edges. In other words the proximal section and the opening 43*d* of the elongated opening 43 into the front edge 44 is located to the left of the middle of the front edge. This has been shown to provide an optimal positioning of the viscera set in relation to the guide member when processing viscera sets from chicken using an eviscerating apparatus of the type described in WO98/44806.

The embodiment in FIG. 3 has a straight, but inclined elongated opening and thus combines the advantages of the embodiment in FIGS. 1 and 2.

In all embodiments shown in FIGS. 1 to 3 at least some of the side edges of the opening 43 are bevelled to aid the insertion and positioning of the viscera set.

The guide member 4 in FIGS. 1 to 3 is substantially square, but it may also be slightly wedge-shaped and quite narrow at the end facing away from the front edge to help the viscera set to reach the desired orientation on the separation support surface and/or convex or concave. Likewise, it will be understood that even though the separation support surface is described as being flat, embodiments where the separation support surface is either convex or concave are also within the scope of the invention.

Edge flanges 46, 47 at the front edge and at the side edges help to keep the liver and gizzard on the separation support surface and prevent unintentional damage to the liver by preventing particularly the lobes of the liver from hanging over the edges.

The guide member may also be composed of two mutually moveable parts (not shown) each forming a side 41, 42 of the separation support surface. The elongated opening 43 may then be formed by each part having a recess in the side facing the other part, or only one part may include a recess. Alternatively, the elongated opening may be provided simply by maintaining a distance between the two parts, and the separation of the intestines and gallbladder from the liver and gizzard may then be achieved by pressing the two parts against each other, possibly combined with a pull on the intestines in a direction away from the guide member.

It is also possible to use a simpler plate member (not shown) with an opening in the middle and where the intestines are simply passed through the opening.

Further details about advantageous embodiments of the guide member may be found in the applicant's previous patent application published under the number WO2015/070880.

The engagement member 8 is of a straight configuration in all of the embodiments shown in FIGS. 1-3 and arranged substantially at a centre of the elongated opening extending in the length direction L of the opening. Due to the proximal and distal sections 43a, 43b being off-set in relation to each other in the embodiment in FIG. 2, the engagement member is shown as located close to one side edge of the opening at the proximal section 43a and close to the opposite side edge at the distal section 43b. At present it is, however, considered advantageous to keep a clearance of at least 1 mm between the engagement member and the side edges of the elongated opening. This will not only prevent direct contact between the guide member and engagement member and hence reduce the wear on these parts, but will also reduce the risk of parts of the viscera set being unintentionally pinched between them. Arranging the engagement member so that it is slightly off-centred in relation to the elongated opening may contribute to keeping the gizzard on the one side of the elongated opening and thus to a precise positioning on the separation support surface as will be described in detail below.

As will also be seen, the transition between the front edge 44 of the guide member and the side edges of the elongated opening 43, 43a is at least somewhat rounded in all embodiments. This will help to prevent that the intestines are pinched between the guide member and the engagement member, particularly when the guide member is pivoted in relation to the engagement member as will be described below.

As is well known to the skilled person, viscera sets from birds are relatively uniform apart from size variations, but as particularly the liver tissue is soft it will not be possible to keep it entirely on one side of the separation support surface. Moreover, a small percentage of birds are anatomically different in the sense that the organs are located at the opposite side of the body cavity compared to normal birds of the same species. In such cases the position of the organs in the eviscerated viscera set hanging in the viscera holder will also be mirror-inverted in comparison to what will be shown and described here. In most cases the present invention will, however, be able to handle such mirror-inverted viscera set, even though the gizzard and liver are lying on the opposite sides of the separation support surface, but the precision of the separation will not be as high. Likewise it will be understood that the organs in some species of birds may be located slightly differently in the viscera set than what is shown in the drawing, which depicts viscera sets from chicken. The relative positions and dimensions described herein may therefore have to be adapted for the particular processing.

Figure 4:
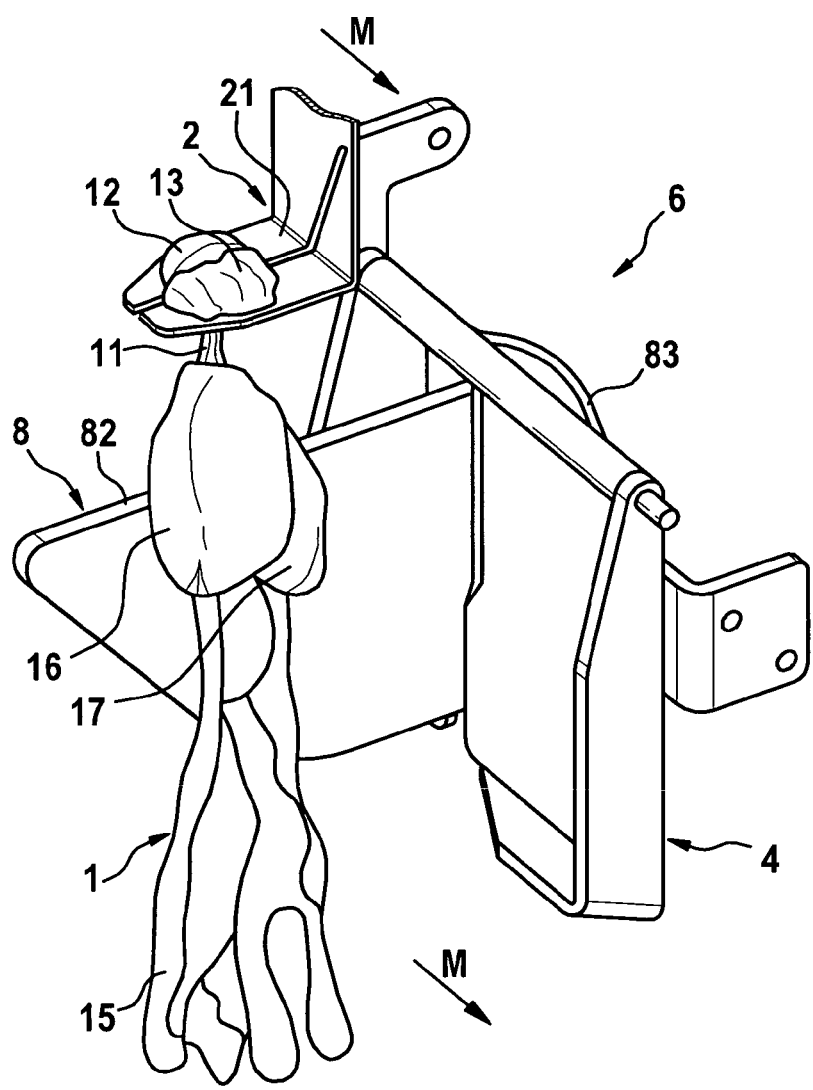
FIG. 4 is a perspective view of a viscera holder holding a viscera set separated from a chicken under the influence of gravity and of a guide assembly including an engagement member and a guide member shown in an inactive position.
Figure 5:
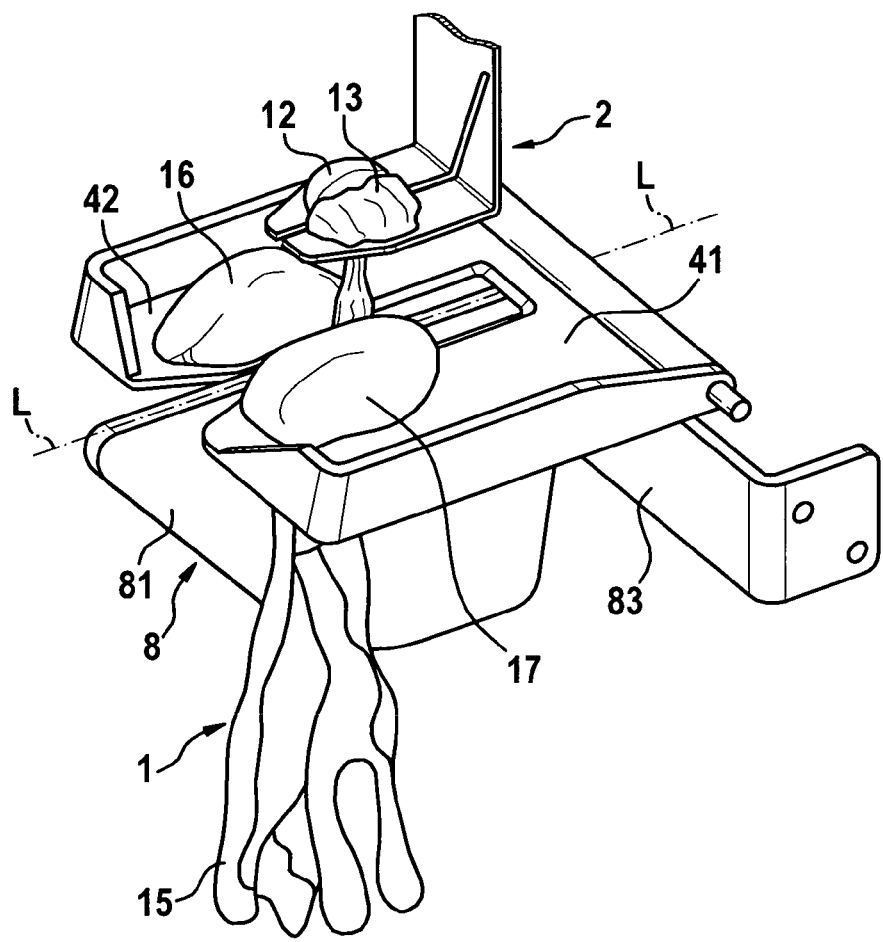
FIG. 5 shows the guide assembly in FIG. 4 in an active position and from a slightly different angle.

Turning now to FIGS. 4 and 5, the guide member 4 and engagement member 8 are shown as parts of a guide assembly 6 and arranged underneath a viscera holder 2, which may be part of an overhead viscera conveyor in a manner well known to the skilled person.

A viscera set from a chicken is shown hanging from the viscera holder 2 in FIGS. 4 and 5. In this case the viscera holder is of the type with two mutually moveable parts and has gripped the esophagus 11 below the heart 12, so that the heart and the lungs 13 are lying on an upper surface 21 of the viscera holder, but the invention works equally well when the esophagus is held between the heart 12 and the crop. Likewise it is to be understood that the viscera holder does not have to clamp the esophagus. It is also noted that though a chicken viscera set is here used as an example, viscera sets from other birds such as ducks, geese, turkeys, pigeons or quails may be held and processed in substantially the same manner.

In the preferred embodiment a series of viscera holders 2 are mounted on an overhead conveyor as is common practice in poultry slaughterhouses and receiving one viscera set at a time, either directly from an eviscerator or from an intermediate unit or conveyor, which may for example serve as a buffer.

The engagement member 8 is here composed of a substantially planar plate member 81 extending in a plane defined by the length direction L of the elongated opening 43 and substantially perpendicular to the plane of the separation support surface 41,42, but a brace or rod extending at the level of the upper edge 82 of the plate member may provide the same function. The plate member 81, which is the part intended to come into contact with the viscera set 15, is attached to a support part 83 adapted to connect to an assembly frame or the like.

In operation the viscera holder 2 and hence the viscera set moves in the direction indicated by the arrows M in FIG. 4, thereby bringing the viscera set into contact with the engagement member 8. This will typically be achieved by moving the viscera holder and the guide assembly at substantially the same speed, at least one of them following a curved track so that viscera holders and guide assemblies arranged in series meet in pairs one by one as the movement advances. This principle of movement is well-known to the skilled person.

The engagement member 8 is arranged in such a height relative to the viscera holder that the centre of gravity of the gizzard 17 is located at the upper edge 82 of the engagement member at least when the movement of the guide member is initiated. This allows the engagement member to keep the gizzard 17 from moving past the elongated opening, thus keeping it adjacent to the part 41 of the separation support surface intended to receive the gizzard and away from the opposite part 42 intended to receive the liver 16. When the guide member is swung from the position in FIG. 4 to the position in FIG. 5, the contact with the engagement member 8 will initially result in both the gizzard 17 and the liver 16 being located at the side 41 of the separation surface intended to receive the gizzard, but due to the differences in density and structure of the gizzard and the liver, the gizzard 17 will come to rest on one side 41 of the elongated opening 43 while the liver 16 swings over it to the opposite side of the elongated opening.

The extent of the engagement member 8 in the horizontal direction perpendicular to the direction of movement M is such that the viscera set does not slide off and pass by the engagement member, and the thickness of the plate member 81 is such that it is sufficiently stiff to hold back the viscera set and that the upper edge 82 does not cut the viscera set.

Using a plate with a height as shown in FIGS. 4 to 8 results in the engagement member 8 also holding back the intestines 15 and thus preventing them from swinging and/or spreading out when the upper parts of viscera set comes into contact with the engagement member. A similar effect may be achieved by using a brace, but the plate member 81 is both comparatively easy to manufacture and to clean.

In the embodiments shown, the engagement member 8 projects into the elongated opening 43 in the guide member until it has been brought to its active second position. This allows the guide member 4 to scoop the viscera set off the engagement member in a controlled manner and with a low risk of pinching the intestines 15 or other parts of the viscera set, but other embodiments are entirely within the scope of the invention.

Figure 6:
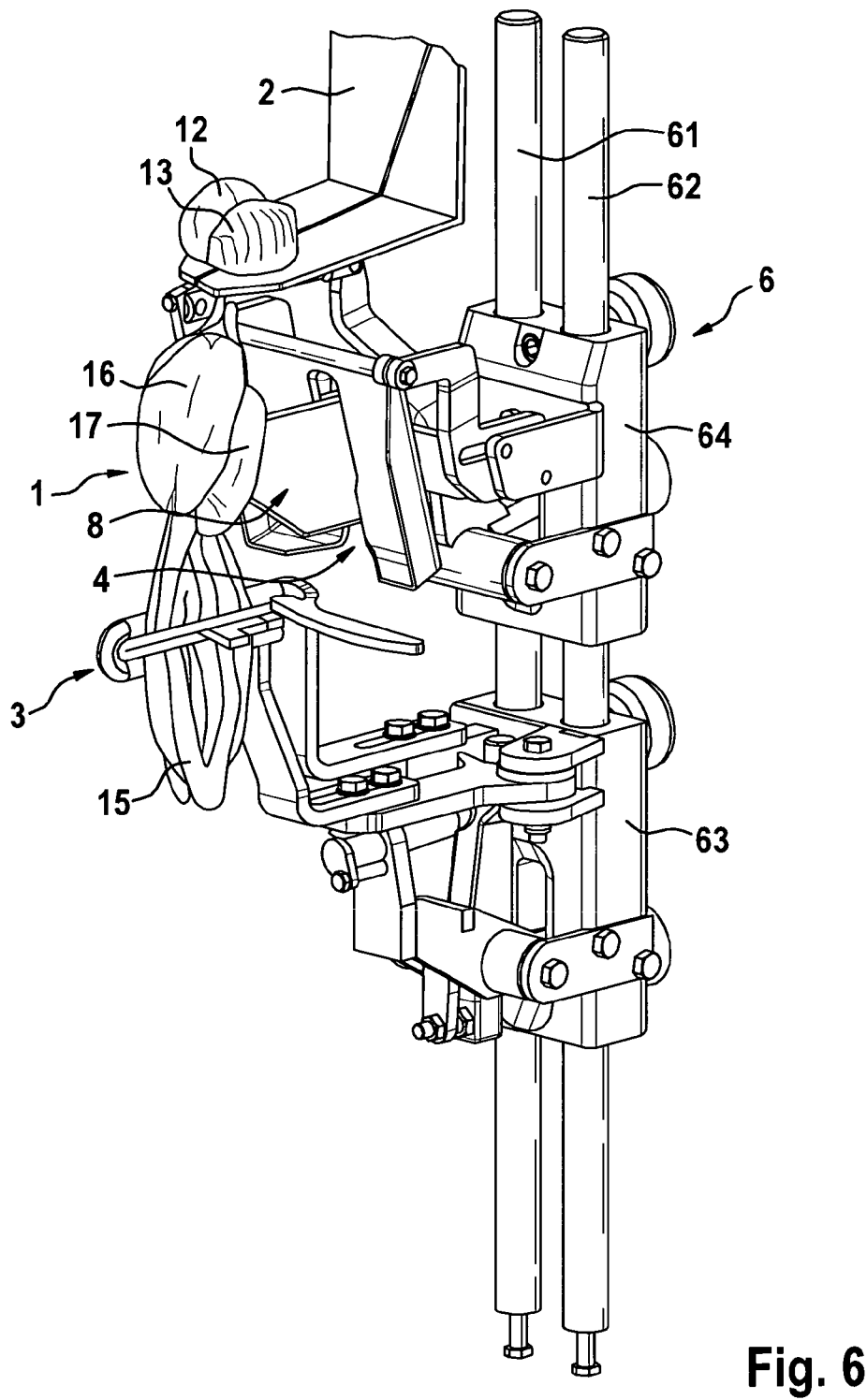
FIG. 6 is a perspective view of a viscera holder holding a viscera set separated from a chicken, and a guide assembly including a guide member, an engagement member and a gripping member mounted on an assembly frame, the guide member being in a first inactive position, FIG. 7 corresponds to FIG. 6, but showing the guide member in a second active position, FIG. 8 corresponds to FIG. 7 but seen from a different angle and including a circular blade inserted between the guide member and the engagement member.
Figure 7:
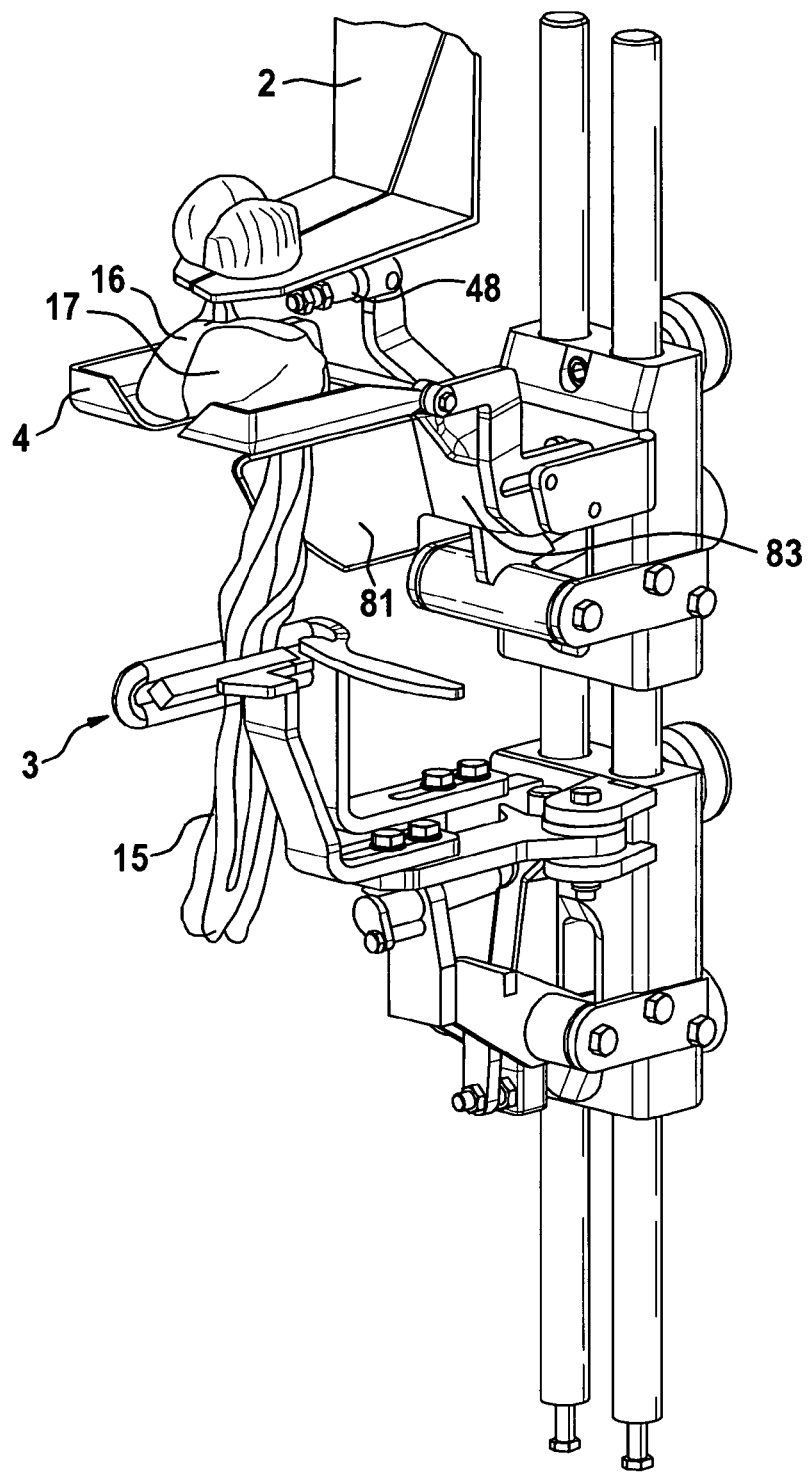
Figure 8:
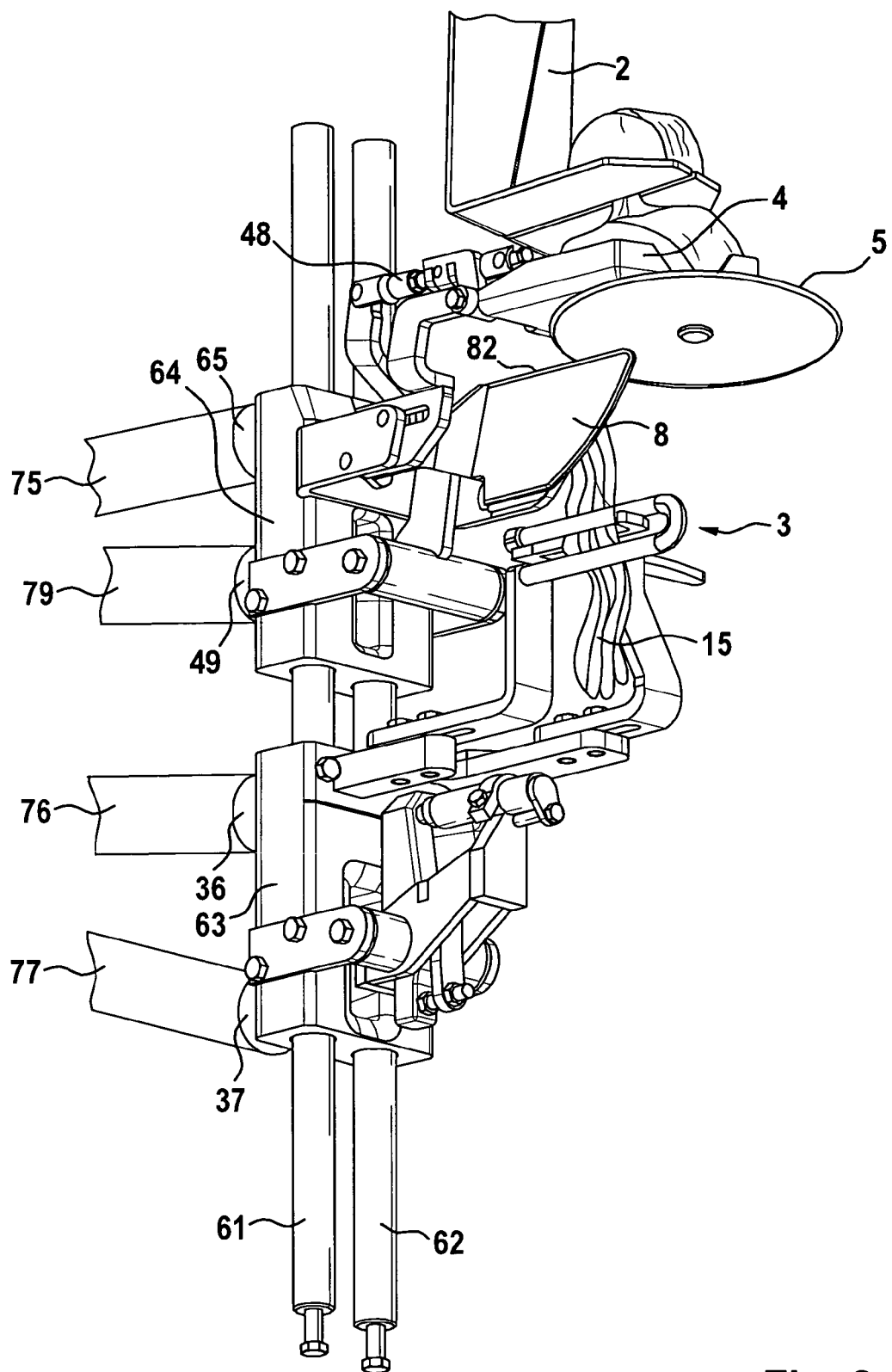

Turning now to FIGS. 6 to 8, a guide assembly 6 resembling that in FIGS. 4 and 5 but also including a gripping member 3 has been provided on an assembly frame as will described later.

In FIG. 6 the guide member 4 is kept in a first inactive, substantially vertical position and in FIG. 7 the guide member has been brought into a second active, substantially horizontal position by being pivoted about the horizontal axle 40. The axle 40 is preferably substantially parallel to the direction of travel of the viscera conveyor, so that the guide member comes in around the intestines 15 from the side and from below, the intestines passing into the elongated opening 43 of the guide member. This swinging or pivoting motion is initiated by the activation mechanism 48, which may be driven by hydraulics or gas, but activation by means for example of an electromotor is also possible.

At the same time as the movement of the guide member 4, the intestines 15 are held or stretched by a downwards movement of the gripping member 3 and/or by the upwards movement of the guide member 4 and/or by an upwards movement of the viscera holder 2. The gripping member may be activated simultaneously with the pivoting of the guide member, but it may also be advantageous to activate the gripping member and possibly inflict a downwards pull on the intestines before activating the guide member.

Here the gripping member 3 is illustrated as a tong-like tool with a U-shaped brace member 31 on one side of the intestines and a single rod 32 on the other side pressing against each other to fixate the intestines, but other embodiments are possible as will be readily imaginable to the skilled person.

When the guide member 4 has been swung to its active position as in FIGS. 5 and 7, the liver 16 and gizzard 17 are resting on the upper separation support surface 41, 42 of the guide member.

A stretching of the intestines 15, either by the gripping member 3, possibly in cooperation with the viscera holder and/or the guide member, or by gravity alone, causes the gallbladder (not shown), which was previously hidden underneath the liver 16, to pass through the elongated opening 43 in the guide member and become exposed on the underside of the guide member. The spleen (not shown) may also come through the elongated opening, but this will usually not be the case when using a guide member as in FIGS. 1 to 3.

When the viscera set is in the position shown in FIGS. 5 and 7, the gallbladder can be separated from the remaining parts of the viscera set together with the intestines 15, for example by means of a rotating blade 5 arranged substantially in parallel with the underside of the guide member and above the upper edge 82 of the engagement member as shown in FIG. 8. It is, however, also possible to use other types of cutting devices or to simply pull the intestines and gallbladder off, even though pulling involves an increased risk of rupturing the gallbladder and/or damaging the liver. Another option is to use a guide member with two parts 41, 42 as described above, where the two parts can be brought close together so that the intestines and gallbladder are either fixated so that they may be pulled off, possibly using the gripping member, or cut off directly by the two parts acting as scissors.

In this as well as in all other embodiments where the guide member 4 is swung from the first to the second position, the swinging allows the liver 16 and gizzard 17 to slide downwards along the opening 43, whereby the gallbladder is loosened from the liver and the viscera set turns into an optimal position for separation. This sliding movement may be simply under the influence of gravity, but it is also possible to cause a slightly oscillating movement by moving the viscera holder 2 and guide member 4 in relation to each other, thereby facilitating the reorientation of the liver, gizzard and gallbladder. The reorientation of the liver and gizzard on the separation support surface also means that they are arranged in a well-defined manner as seen in FIG. 5, which may be advantageous for a later separation of these from each other and from other parts of the viscera set.

In the embodiment in the drawing, the intestines are arranged vertically when gripped by the gripping member 3, but it may prove advantageous to arrange them in another direction and the direction of the intestines may also be changed during the process by changing the mutual position of the gripping member, the engagement member and the guide member and/or the angle of one or both of them. The force applied to stretch the intestines may also change, potentially resulting in an oscillating movement of the intestines.

The exact angles and forces resulting in an optimal positioning of the intestines 15, gallbladder and liver 16 in relation to the guide member 4 will depend on numerous factors such as the angle of the separation support surface 41, 42, the size and shape of the opening 43, the dimensions and position of the engagement member 8 and the nature of the viscera sets being processed.

A single cut through all of the tissue connecting the intestines 15, the gallbladder to the rest of the viscera set will provide a very precise separation, but an even greater precision with reduced waste of liver tissue and less ruptured gallbladders may be achieved by performing two consecutive cuts: A first or pre-cut separates the intestines and surrounding connective tissue, fat and membranes from the gizzard, and a second or main cut separates the gallbladder from the liver, possibly also cutting loose the spleen.

The pre-cut results in the weight of the intestines and any pulling force applied by the gripping member to affect only the connections to the liver, resulting in the gall bladder being pulled out from the liver tissue and thus exposing the string of tissue connecting them. The second cut can thus be performed with a considerably reduced risk of cutting into the liver or gall-bladder.

When processing chicken viscera sets the depth of the pre-cut should be approximately 7 mm and it has been found optimal to pull the intestines approximately 2 cm further down after the pre-cut for further exposure of the gallbladder.

Though the two separate steps for separating the intestines from the gizzard and the gallbladder from the liver have been described above as being performed by cutting it will be understood that one or both of them might also be performed in other ways, for example by pulling. Likewise it will be under-stood that one or more cuts may be made using other means than the circular blade 5 shown, such as for example a linear blade or a pair of blades acting as scissors.

In FIGS. 6 to 8 the gripping member 3, the engagement member 8 and guide member 4 are mounted on an assembly frame including a pair of rods 61, 62 as will be described in detail below. Such rods may be attached to a carrousel-type processing station as is well known to the skilled person, thereby allowing the guide assembly 6 to travel alongside an overhead viscera conveyor (not shown), the rods being substantially vertical or slightly inclined away from the viscera holder. If the conveyor turns at the carrousel with a radius of curvature corresponding substantially to the radius of the carrousel, the guide assembly and viscera holders on the conveyors will travel substantially in parallel over a section of the conveyor as will also be described with reference to FIG. 9.

The gripping member 3 is attached to the rods via a first base member 63 and the guide member 4 and the engagement member 8 are attached to the same rods via a second similar base member 64. A wheel 65 on the back side of the second base member is adapted for travelling in a guide track 75 on the apparatus as illustrated in FIG. 8 and similar guide tracks 76, 77, 79 are provided for the other wheels 36, 37, 49, respectively. When the guide track has an upwards inclination, the wheel and hence also the base member will be forced upwards, the base member sliding up along the rods, and vice versa when the guide track has a downwards inclination as is well known from other processes in poultry slaughterhouses. The first base member is provided with a similar wheel 36, but it is to be understood that both may be stationary or that the first may be moveable and the second stationary in relation to the rods 61, 62. Additional wheels 37, 49 are provided for controlling the angle of the base members. Any of these embodiments will provide the mutual change of position of the gripping member and the guide member described above.

In all of the embodiments shown the guide member is substantially horizontal in its active position, but it will be understood that this need not be the case. Any angle between 45 degrees and horizontal may be suitable for supporting the liver and gizzard depending amongst other things on the presence of edge flanges and if the intestines are held by a gripper or not. Likewise it is also possible to turn it over the horizontal plane so that the liver and gizzard will slide towards the distal end of the elongated opening. This possibility for arranging the guide member in a different angle also applies to other embodiments as far as the guide member is able to support the liver and the gizzard properly. Likewise, the guide member may be inclined so that either the leading edge or the trailing edge when seen in the direction of travel of the guide assembly and/or viscera conveyor is raised in relation to the other. Such inclinations may facilitate the positioning of the viscera set on the guide member.

It is noted that the viscera sets shown in FIGS. 4 to 8 are hanging with the liver 16 to the left in the figures, i.e. with the side of the viscera set originally facing the breast of the bird before evisceration facing away from the viscera holder 2 and guide assembly frame 6. If a different evisceration method is used or if the viscera sets are hanging in the opposite direction due to the method of transfer to the viscera holder, the viscera set should be made to engage the engagement member 8 from the opposite side so that gizzard 17 is always closest to the engagement member.

Even though the invention has here been described with reference to embodiments having both a guide member 4, an engagement member 8 and a gripping member 3, the gripping member might in principle be arranged apart from the guide assembly at an earlier stage in the processing of the birds, or even dispensed with, simply relying on gravity to pull the intestines 15 down. This also implies that the guide member 4 and engagement member 8 may be designed independently of the design of the gripping member 3 and vice versa and that the combinations described above are therefore only to be regarded as non-limiting examples.

Figure 9:
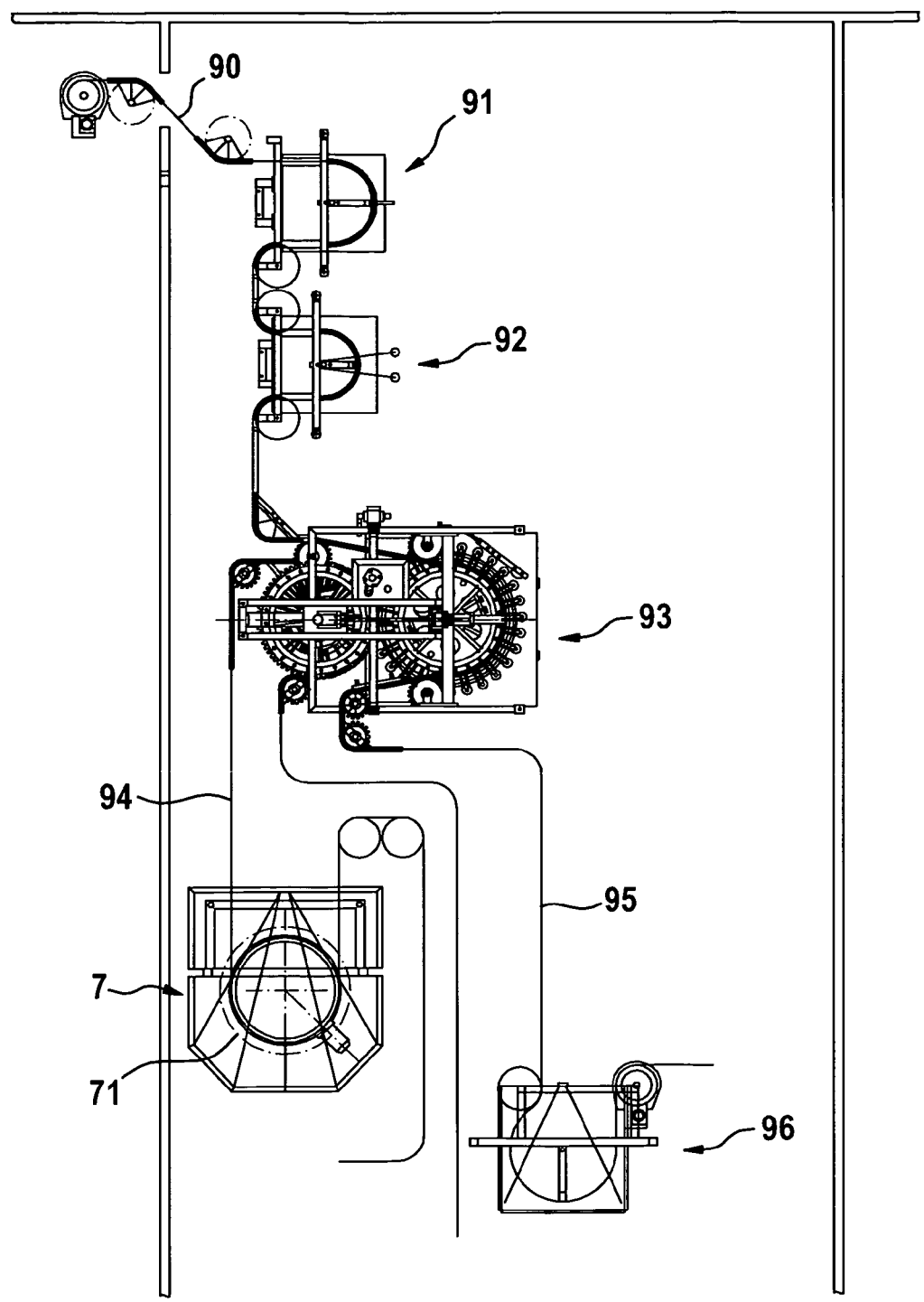
FIG. 9 is a schematic illustration of the layout of a section of a poultry slaughter house including a system according to the invention.

The guide assembly 6 is part of a system 7 for separating viscera sets eviscerated from slaughtered poultry and this system in turn is intended for use in a poultry slaughterhouse, where it is arranged in series with other poultry processing systems. An example of the layout of a section of a poultry slaughterhouse including a system 7 according to the invention is shown in FIG. 9. Poultry (not shown), which has previously been stunned or killed and hung from the legs on an overhead conveyor 90, enters this section of the slaughterhouse at the upper left-hand corner in FIG. 9. From here the birds are first taken to a vent cutter 91 and then to an opening machine 92, before being eviscerated in an eviscerator 93. The viscera sets (not shown in FIG. 9) are conveyed away from the eviscerator on a viscera conveyor 94 to the sys-tem 7 according to the invention, while the carcasses are conveyed on a separate conveyor 95 to a cropping station 96. Further processing stations of known types may be provided further downstream on the viscera and carcass conveyors, but are not shown or described here.

The viscera set separating system 7 is here of the carrousel type with guide assemblies 6 distributed evenly along its periphery 71. The guide assemblies are arranged at the same mutual distance as the distance between viscera holders 2 on the viscera conveyor 94 and the carrousel is running at substantially the same speed as the conveyor. When passing the separating system 7 the viscera conveyor 94 performs a 180 degree turn, meaning that the viscera holders on the conveyor and the guide assemblies on the separating system run in parallel over approximately half the circumference of the carrousel. The fact that the guide assemblies move together with the viscera holder means that the impacts resulting from a moving viscera set on a viscera conveyor meeting a stationary engagement member 8 are avoided. It will, however, be understood that the invention will also work in poultry slaughterhouses having a different layout, and that the function of the guide assembly is in principle independent of the design of the rest of the system.

The guide assembly 6 is thus potentially moveable in at least two ways: It may move up and down in relation to the viscera holder 2 as shown in FIGS. 4 to 8, and it may move in parallel with the viscera conveyor as shown in FIG. 9. One of these ways of movement will in principle be sufficient to provide an advantage over the prior art, but further advantages are achieved by combining them.

It is noted that the direction of travel of the viscera conveyor in FIG. 9 is the same as the direction of the movement shown in FIG. 4, but that the opposite direction of travel is also possible. If travelling in the opposite direction and if the guide assembly and system described with reference to FIGS. 4 to 8 were to be applied directly, the viscera sets would be coming into contact with the opposite side of the engagement member 8. If the orientation of the viscera sets and the direction of entry into the separating system 7 are not such that the viscera sets automatically comes to engage the engagement members from the optimal side as explained above, a buffer or delay mechanism may be employed so that it is instead the engagement member 8 engaging the viscera set. Such mechanisms are well known from other processes in the poultry industry.

The invention claimed is:

1. A method for separating a viscera set eviscerated from slaughtered poultry, said viscera set including gizzard, liver, intestines and gallbladder, and being held by a viscera holder on a viscera conveyor in a manner whereby at least the liver, the intestines and the gallbladder are suspended below said viscera holder, said method comprising the steps of:
   A) moving a guide member from a first position to a second position so that said viscera set is arranged in an elongated opening of the guide member in a manner whereby the intestines and the gallbladder are suspended below said guide member and the liver and gizzard are positioned above said guide member, said elongated opening having a length direction, and
   B) separating the intestines and the gallbladder from the remaining viscera set while the guide member is in the second position and said liver and said gizzard rests on a separation support surface of said guide member, said separation surface including a first part on one side of the elongated opening adapted for supporting the gizzard and a second side on the opposite side of the elongated opening adapted for supporting the liver, characterized in that
      before or simultaneous with step A) the viscera set is brought into contact with an engagement member in a manner so that at least the gizzard is kept on the one side of the elongated opening at least until coming into contact with the separation support surface.

2. The method according to claim 1, characterized in that the guide member is moved between the first position and the second position in a pivoting movement.

3. The method according to claim 1, characterized in that at least a part of the engagement member projects into the elongated opening at least during a part of step A).

4. The method according to claim 3, characterized in that the engagement member projects through the elongated opening when the guide member is in the first position and does not project into the elongated opening when the guide member is in the second position.

5. The method according to claim 1, characterized in that the viscera set is brought into contact with the engagement member in a manner so that the centre of gravity of the gizzard is engaging the engagement member directly or indirectly.

6. The method according to claim 1, characterized in that the part of the engagement member coming into contact with the viscera set is plate-shaped, substantially planar and arranged to extend in a plane defined by the length direction of the elongated opening, and substantially perpendicular to the plane of the separation support surface at the elongated opening.

7. The method according to claim 1, characterized in that the intestines are gripped by a gripping member before or simultaneously with step A), said gripping member possibly performing a vertical movement whereby the intestines are pulled downwards through the elongated opening of the guide member and/or the viscera holder and/or guide member being moved upwards away from the gripping member.

8. The method according to claim 1, characterized in that the intestines and the gallbladder and possibly the spleen are separated from the remaining viscera set by:
   a blade positioned between said guide member and said engagement member;
   edges of the elongated opening of the guide member being moved together like scissors; and/or
   a pull on the intestines and/or gallbladder.

9. The method according to claim 1, wherein said viscera holder and a guide assembly including the guide member and the engagement member are moved as a pair at least for a distance.

10. The guide assembly for use in a system for separating viscera sets including gizzard, liver, intestines and gallbladder and being eviscerated from slaughtered poultry,
   including a guide member, which is moveable between a first position and a second position and which comprises a separation support surface having an elongated opening with a length direction for receiving a viscera set in a manner whereby at least the intestines and the gallbladder are suspended below said guide member and the liver and gizzard are positioned above said guide member, and where said separation surface includes a first part on one side of the elongated opening adapted for supporting the gizzard and a second side on the opposite side of the elongated opening adapted for supporting the liver,
   characterized in that
   the guide assembly further includes an engagement member arranged so that the engagement member keeps at least the gizzard on the one side of the elongated opening at least until coming into contact with the separation support surface.

11. A guide assembly according to claim 10, wherein the guide member is able to pivot about an axis (R), which is substantially perpendicular to the elongated opening and/or parallel to the front edge of the guide member.

12. The guide assembly according to claim 10, wherein the guide member is moveable between a first inactive position and a second active position, the separation support surface preferably being substantially vertical in the first position and substantially horizontal in the second position.

13. The guide assembly according to claim 10, characterized in that at least a part of the engagement member projects into the elongated opening at least in one position of the guide member.

14. The guide assembly according to claim 10, characterized in that the engagement member includes a plate member adapted for coming into contact with the viscera set, said plate member being substantially planar and extending in a plane defined by the length direction of the elongated opening, and substantially perpendicular to the plane of the separation support surface at the elongated opening at least when the guide member is in the second position.

15. The guide assembly according to claim 10, further comprising a gripping member arranged below said guide member for gripping a part of the intestines and/or comprising an assembly frame on which said guide member and/or said engagement member and/or said gripping member are arranged.

16. The guide assembly according to claim 10, further comprising an assembly frame and wherein at least said guide member is vertically movably arranged on said assembly frame with a first vertical position adapted for receiving a viscera set and a second vertical position above said first vertical position.

17. A system for separating viscera sets eviscerated from slaughtered poultry, said viscera set including gizzard, liver, intestines and gallbladder, and said system comprising at least one guide member and viscera conveyor comprising a plurality of viscera holders, wherein each viscera holder is configured to hold a viscera set in a manner whereby at least the liver, the intestines, and the gall-bladder are suspended below said viscera holder;

said guide member is moveable between a first position and a second position, said guide member comprises an elongated opening with a length direction, said guide member being configured to, while being moved from the first position to the second position, receive a viscera set held by a viscera holder in said elongated opening in a manner whereby the intestines and the gallbladder are suspended below said guide member and the liver and gizzard are positioned above said guide member; and said system is configured to separate the intestines and the gallbladder from the remaining viscera set while said liver and said gizzard rests on a separation support surface of said guide member and the guide member is in the second position, said separation support surface including a first part on one side of the elongated opening adapted for supporting the gizzard and a second side on the opposite side of the elongated opening adapted for supporting the liver, characterized in that at least one engagement member is arranged so that the at least one engagement member keeps at least the gizzard on the one side of the elongated opening at least until coming into contact with the separation support surface.

18. The system according to claim 17, characterized in that the system further includes an activation mechanism adapted for moving the guide member, preferably to pivot about a horizontal axis.

19. The system according to claim 17, wherein said viscera holders are adapted for moving substantially in the same horizontal plane and wherein said guide member is adapted for being moved upwards towards a viscera holder, possibly by a pivoting movement.

20. The system according to claim 17, characterized in that the system further includes a blade or similar cutting device arranged below the separation support surface at least when in a use position, said blade or similar cutting device preferably being adapted for being positioned between the engagement member and the guide member, when the guide member is in the second position.

21. The system according to claim 17, wherein the system further comprises a plurality of gripping members, wherein each gripping member is configured to move with a particular viscera holder and grip the intestines, each gripping member preferably being configured to perform a downwards displacement and pull the intestines downwards through the elongated opening of the guide member.

* * * * *